United States Patent
Van Beek et al.

(10) Patent No.: US 9,307,251 B2
(45) Date of Patent: Apr. 5, 2016

(54) METHODS AND SYSTEMS FOR DETERMINING DATA-ADAPTIVE WEIGHTS FOR MOTION ESTIMATION IN A VIDEO SEQUENCE

(75) Inventors: Petrus J. L. Van Beek, Camas, WA (US); Xinyu Xu, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1472 days.

(21) Appl. No.: 12/543,597

(22) Filed: Aug. 19, 2009

(65) Prior Publication Data

US 2011/0043706 A1 Feb. 24, 2011

(51) Int. Cl.
| | |
|---|---|
| H04N 7/12 | (2006.01) |
| H04N 19/14 | (2014.01) |
| G06T 7/00 | (2006.01) |
| G06T 7/20 | (2006.01) |
| H04N 19/196 | (2014.01) |
| H04N 19/17 | (2014.01) |
| H04N 19/57 | (2014.01) |

(52) U.S. Cl.
CPC .............. *H04N 19/14* (2014.11); *G06T 7/0002* (2013.01); *G06T 7/2066* (2013.01); *H04N 19/17* (2014.11); *H04N 19/196* (2014.11); *H04N 19/57* (2014.11); *G06T 2207/10016* (2013.01)

(58) Field of Classification Search
CPC ........... H04N 7/12; H04N 7/50; H04N 19/17; H04N 19/196; H04N 19/117; H04N 19/136; H04N 19/198; H04N 19/513; H04N 19/521; H04N 19/53; H04N 19/80; H04N 19/14; H04N 19/57; G06T 2207/10016; G06T 7/0002; G06T 7/2066
USPC .................................................... 375/240.16
See application file for complete search history.

(56) References Cited

U.S. PATENT DOCUMENTS

| | | | |
|---|---|---|---|
| 5,539,469 A | 7/1996 | Jung | |
| 6,084,908 A | 7/2000 | Chiang et al. | |
| 7,324,596 B2 | 1/2008 | Gallant et al. | |
| 2002/0012393 A1* | 1/2002 | Tanase | H04N 5/145 375/240.01 |
| 2006/0034373 A1* | 2/2006 | Gunter | H04N 19/543 375/240.12 |
| 2006/0104359 A1 | 5/2006 | Zhou et al. | |
| 2007/0196018 A1* | 8/2007 | Chen | G06T 7/2026 382/209 |
| 2008/0212676 A1 | 9/2008 | Liu et al. | |
| 2009/0087121 A1* | 4/2009 | Han | G06T 5/002 382/266 |

OTHER PUBLICATIONS

Masatoshi Okutomi and Takeo Kanade, "A Locally Adaptive Window for Signal Matching," in Proceedings International Conference on Computer Vision (ICCV), Dec. 1990, pp. 190-199.

Stefan Scherer, Wilfried Andexer and Axel Pinz, "Robust Adaptive Window Matching by Homogeneity Constraint and Integration of Descriptions," in Proceedings 14th International Conference on Pattern Recognition (ICPR '98), Aug. 16-20, 1998, pp. 777-779, vol. 1.

(Continued)

*Primary Examiner* — Jessica M Prince
(74) *Attorney, Agent, or Firm* — Law Office of Gerald Maliszewski; Gerald Maliszewski (57) ABSTRACT

Aspects of the present invention are related to systems and methods for determining local-analysis-window size and weighting parameters in a gradient-based motion estimation system.

3 Claims, 3 Drawing Sheets

(56) References Cited

OTHER PUBLICATIONS

Ebroul Izquierdo M., "Improved Disparity Estimation by Matching with an Adaptive Window," IAPR Workshop on Machine Vision Applications (MVA '98), Nov. 17-19, 1998, pp. 65-68, Makuhari, Chiba, Japan.

Andrea Fusiello, Vito Roberto and Emanuele Trucco, "Efficient Stereo with Multiple Windowing," in Proceedings 1997 IEEE Computer Society Conference on Computer Vision and Pattern Recognition (CVPR '97), Jun. 17-19, 1997, pp. 858-863, IEEE Computer Society Press, Puerto Rico.

Jen-Luc Lotti and Gerard Giraudon, "Adaptive Window Algorithm for Aerial Image Stereo," in 12th International Conference on Pattern Recognition (ICPR '94), 1994, pp. 701-703, vol. 1, Jerusalem, Israel.

Boguslaw Cyganek, "Adaptive Window Growing Technique for Efficient Image Matching", in Lecture Notes in Computer Science, 2005, pp. 308-315, vol. 3522, Springer-Verlag, Germany.

Olga Veksler, "Fast Variable Window for Stereo Correspondence using Integral Images," in Proceedings IEEE Conference on Computer Vision and Pattern Recognition (CVPR '03), Jun. 18-20, 2003, pp. 556-561.

* cited by examiner

METHODS AND SYSTEMS FOR DETERMINING DATA-ADAPTIVE WEIGHTS FOR MOTION ESTIMATION IN A VIDEO SEQUENCE

FIELD OF THE INVENTION

Embodiments of the present invention relate generally to methods and systems for motion estimation, and in particular, to methods and systems for gradient-based motion estimation in a video sequence.

BACKGROUND

In motion estimation, also referred to as optical flow estimation and displacement estimation, the correspondences between areas in different video frames, also referred to as images, in a video sequence may be determined. The motion of objects in the actual scene captured in the video sequence, in addition to camera motion, may result in moving visual patterns in the video frames. A goal of true motion estimation may be to estimate the two-dimensional (2D) motion of a visual pattern from one frame to another such that the estimated 2D motion may be the projection of the actual three-dimensional (3D) scene motion. The estimated motion field may be used in applications in many areas, for example, video processing, video coding, computer vision and other video and imaging areas. Exemplary applications may include motion-compensated video coding, motion-compensated video filtering and motion-compensated frame interpolation.

Gradient-based motion estimation may be one important class of motion estimation methods. Another important class of motion estimation methods may be block matching. In gradient-based motion estimation, local motion may be modeled as substantially constant in a neighborhood proximate to a pixel location where a motion vector may be estimated. The neighborhood may be referred to as a local analysis window, analysis window or window. Spatial and temporal derivative values, also referred to as spatio-temporal gradients, of the pixel data in the window may be determined and used to compute a motion vector, a displacement vector or other parameters corresponding to the associated motion.

The potential presence of multiple objects within an analysis window may generate problems with a gradient-based motion estimation approach, wherein local motion may be modeled to be substantially constant in a neighborhood, due to the possibility of each of the multiple objects being associated with differing motion within the captured scene. The presence of multiple motions within the analysis window may lead to inaccurate estimates of the motion vector, or other motion parameters, being estimated.

Additionally, the data within an analysis window may comprise one or more noise components due to, for example, camera noise, compression noise or other noise. The noisy data within an analysis window may lead to inaccurate motion vector, or other motion parameter, estimates. This problem may be especially apparent when the analysis window is not sufficiently large enough to ensure accurate motion estimation.

Typically, the size and shape of a local analysis window is held constant. In a few techniques, the window size may be varied in an adaptive manner. However, in these techniques, motion estimation is performed for all candidate window sizes with a resulting motion vector, or other motion parameters, being selected, according to some criterion, from the results associated with the candidate windows. Thus, for these techniques, there may be a considerable increase in the required processing time or resources.

Samples, also referred to as pixels, within a local analysis window may typically be weighted equally or weighted based on their distance from the center sample in the window. Weighting according to these methods may be referred to as weighting by fixed window functions, and may be considered non-data-adaptive weighting.

Systems and methods for motion estimation that provide solutions to the above-mentioned problems associated with gradient-based motion estimation, in particular, solutions incorporating adaptive window size, solutions robust to noise and solutions that account for the presence of multiple objects and multiple motions, may be desirable for many important video processing applications.

SUMMARY

Some embodiments of the present invention comprise methods and systems for selecting an appropriate local-analysis-window size prior to computation of a motion vector in a gradient-based motion estimation method or system. According to embodiments of the present invention, the size of a local analysis window may be selected based on a threshold associated with the noise measured in a current image frame of an image sequence and a local structural variation estimated within a candidate window.

Some embodiments of the present invention comprise methods and systems for determining data-adaptive weights for gradient-based motion estimation.

In some embodiments of the present invention, a data-adaptive weight value associated with a first location in a local analysis window may be determined based on a difference between a window-center value associated with a center location in the local analysis window and an image value associated with the first location.

In alternative embodiments, a data-adaptive weight value associated with a first location in a local analysis window may be determined based on an average estimated gradient strength associated with a small window within the local analysis window and an estimated gradient strength at said first location.

In yet alternative embodiments, a data-adaptive weight value associated with a first location in a local analysis window may be a combination of a weight value determined based on a difference between a window-center value associated with a center location in the local analysis window and an image value associated with the first location and a weight value determined based on an average estimated gradient strength associated with a small window within the local analysis window and an estimated gradient strength at said first location.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

In motion estimation, also referred to as optical flow estimation and displacement estimation, the correspondences between areas in different video frames, also referred to as images, in a video sequence may be determined. The motion of objects in the actual scene captured in the video sequence, in addition to camera motion, may result in moving visual patterns in the video frames. A goal of true motion estimation may be to estimate the two-dimensional (2D) motion of a visual pattern from one frame to another such that the estimated 2D motion may be the projection of the actual three-dimensional (3D) scene motion. The estimated motion field may be used in applications in many areas, for example, video processing, video coding, computer vision and other video and imaging areas. Exemplary applications may include motion-compensated video coding, motion-compensated video filtering and motion-compensated frame interpolation.

Gradient-based motion estimation may be one important class of motion estimation methods. Another important class of motion estimation methods may be block matching. In gradient-based motion estimation, local motion may be modeled as substantially constant in a neighborhood proximate to a pixel location where a motion vector may be estimated. The neighborhood may be referred to as a local analysis window, analysis window or window. Spatial and temporal derivative values, also referred to as spatio-temporal gradients, of the pixel data in the window may be determined and used to compute a motion vector, a displacement vector or other parameters corresponding to the associated motion.

The potential presence of multiple objects within an analysis window may generate problems with a gradient-based motion estimation approach, wherein local motion may be modeled to be substantially constant in a neighborhood, due to the possibility of each of the multiple objects being associated with differing motion within the captured scene. The presence of multiple motions within the analysis window may lead to inaccurate estimates of the motion vector, or other motion parameters, being estimated.

Additionally, the data within an analysis window may comprise one or more noise components due to, for example, camera noise, compression noise or other noise. The noisy data within an analysis window may lead to inaccurate motion vector, or other motion parameter, estimates. This problem may be especially apparent when the analysis window is not sufficiently large enough to ensure accurate motion estimation.

Typically, the size and shape of a local analysis window is held constant. In a few techniques, the window size may be varied in an adaptive manner. However, in these techniques, motion estimation is performed for all candidate window sizes with a resulting motion vector, or other motion parameters, being selected, according to some criterion, from the results associated with the candidate windows. Thus, for these techniques, there may be a considerable increase in the required processing time or resources.

Samples, also referred to as pixels, within a local analysis window may typically be weighted equally or weighted based on their distance from the center sample in the window. Weighting according to these methods may be referred to as weighting by fixed window functions, and may be considered non-data-adaptive weighting.

Systems and methods for motion estimation that provide solutions to the above-mentioned problems associated with gradient-based motion estimation, in particular, solutions incorporating adaptive window size, solutions robust to noise and solutions that account for the presence of multiple objects and multiple motions, may be desirable for many important video processing applications.

Exemplary embodiments of the present invention described herein may be described in relation to single-channel images for illustrative purposes. The descriptions of these embodiments of the present invention are not to be considered limiting of the scope of the present invention, for the invention may admit to other equally effective embodiments related to multi-channel, color and other non-single-channel images as would be appreciated by a person having ordinary skill in the art. Additionally, exemplary embodiments of the present invention described herein may be described in relation to a single displacement vector. The descriptions of these embodiments of the present invention are not to be considered limiting of the scope of the present invention, for the invention may admit to other equally effective embodiments related to other motion models, for example, affine motion and other models, as would be appreciated by a person having ordinary skill in the art.

In motion estimation, an identified 2D region in a current image may be associated with a corresponding 2D region in a reference image by a motion vector, a displacement vector or other motion parameters. For illustrative purposes herein, the current image may be denoted $f(x,y)$, and the reference image may be denoted $g(x,y)$, where x and y represent coordinates of a pixel location in an image. The pixel values $f(x,y)$ and $g(x,y)$ may represent gray-levels, luma values or other image-derived values. The two images, the current image and the reference image, may be two frames in a video sequence. The region in the current image may be an area associated with a single pixel location, a rectangular block of pixel locations or an arbitrarily shaped region in the image. The set of all motion vectors for all image regions may be referred to as a motion vector field, or a displacement vector field.

One class of methods that have been widely implemented and used in practical applications, for example, video encoding, video processing and other video applications, is referred to as block matching. In block matching, the current image may be divided into rectangular blocks, and a motion vector may be estimated for each block by searching for a closest-matching block in the reference image.

Another well-known class of methods may be referred to as gradient-based motion estimation. Gradient-based motion estimation also may be referred to as differential motion estimation or optical flow estimation. In these methods, a motion vector, optical flow vector or displacement vector may be calculated on the basis of spatial and temporal image derivatives, or image differences. While block matching comprises a search procedure for the best motion vector, gradient-based techniques allow for direct computation of a motion vector.

The Lucas and Kanade based approach is a well-known class of gradient-based motion estimation methods. In a basic Lucas and Kanade motion estimation technique, considering a pixel at location (i,j) in a current image, or video frame, f(x,y), the goal is to find a corresponding pixel in a reference image, or video frame, g(x,y), that is most similar to the given pixel in the current image. The vector from pixel location (i,j) in the current image to a location (p,q) associated with the most-similar pixel in the reference image may be denoted by $v(i,j)=(u(i,j),v(i,j))^T$ and may be referred to as the displacement vector, or motion vector, where u and v are the horizontal and vertical components, respectively. The dependency on (i,j) may be dropped for notational convenience, and the motion vector being estimated may be denoted $v=(u,v)^T$. Assuming that the intensity, or brightness, of a pixel at location (i,j) is preserved, or constant, in the current image and the reference image, a brightness constancy constraint equation may be given by:

$$f_x u + f_y v + f_t = \nabla f^T \cdot v + f_t = 0,$$

where $f_x$ and $f_y$ are the partial spatial derivatives of the image in the x- and y-directions, respectively, and $f_t$ is the temporal derivative, all at pixel location (i,j) and a time associated with the temporal offset between the current frame and the reference frame. $\nabla f = (f_x, f_y)^T$ is the spatial image gradient at (i,j). The spatial and temporal image derivatives may be estimated from the image data.

Constraining the local motion to be constant in a local analysis window or neighborhood, denoted $\Omega_{i,j}$, proximate to the location (i,j), a motion vector maybe computed as that which minimizes, across all pixels within the neighborhood $\Omega_{i,j}$, the residuals of the constraint term $f_x u + f_y v + f_t = \nabla f^T \cdot v + f_t = 0$. The weighted error cost function E(v)=E(u,v) given by:

$$E(v) = E(u, v) = \sum_{m,n \in \Omega_{i,j}} w(m, n)[f_x(m, n)u + f_y(m, n)v + f_t(m, n)]^2$$

results in a weighted least-squares estimate for the motion vector $v=(u,v)^T$. The motion vector that minimizes the weighted error cost function above may be given by the solution of the 2×2 system of linear equations:

$$Mv = b$$

where $$M = \begin{bmatrix} \sum_{m,n \in \Omega_{i,j}} w(m,n)f_x(m,n)f_x(m,n) & \sum_{m,n \in \Omega_{i,j}} w(m,n)f_x(m,n)f_y(m,n) \\ \sum_{m,n \in \Omega_{i,j}} w(m,n)f_x(m,n)f_y(m,n) & \sum_{m,n \in \Omega_{i,j}} w(m,n)f_y(m,n)f_y(m,n) \end{bmatrix}$$

and $$b = \begin{bmatrix} -\sum_{m,n \in \Omega_{i,j}} w(m,n)f_x(m,n)f_t(m,n) \\ -\sum_{m,n \in \Omega_{i,j}} w(m,n)f_y(m,n)f_t(m,n) \end{bmatrix}.$$

Given estimates of the spatial and temporal derivatives, the above 2×2 system of equations may be solved in closed form using any of the techniques known in the art. Additionally, the solution may be determined in an iterative manner. In an iterative solution, an initial motion vector may be computed in the first iteration, and updates to the initial estimate may be computed in subsequent iterations.

Typically, the shape and size of the local analysis window is held constant, and the weights w(m,n) conform to a basic window function, for example, the rectangular function: w(m,n)=1 for all $m,n \in \Omega_{i,j}$, that is, all pixels within the window contribute equally to the error function. Another common window function is the Gaussian function:

$$w(m, n) = K \exp\left(\frac{(m-i)^2 + (n-j)^2}{2\sigma^2}\right),$$

where the parameter σ may determine how fast the weights decrease towards zero when moving away from the center of the local analysis window.

The choice of the size of a local analysis window, as well as the choice of the window or weighting function are both critical in a Lucas and Kanade based motion estimation technique due to their strong influence on performance. For example, the locally constant motion model within the analysis window frequently does not hold. There may be pixels of multiple scene objects that fall inside the window, each of which may have significantly different motions. The larger the window size selected, the more likely it is that multiple motions exist within the window area making it more likely that the least-squares solution will fail or be inaccurate. On the other hand, there is a requirement to include a sufficient number of pixels in the window so as to sufficiently constrain the solution and provide robustness to noise. If the window is too small, the solution may be very sensitive to noise. Hence, there are conflicting requirements with respect to the size of the local analysis window.

Embodiments of the present invention comprise methods and systems for local-analysis-window size selection in gradient-based motion estimation leading to improved motion-estimation performance in video data in important video processing applications.

Figure 1:
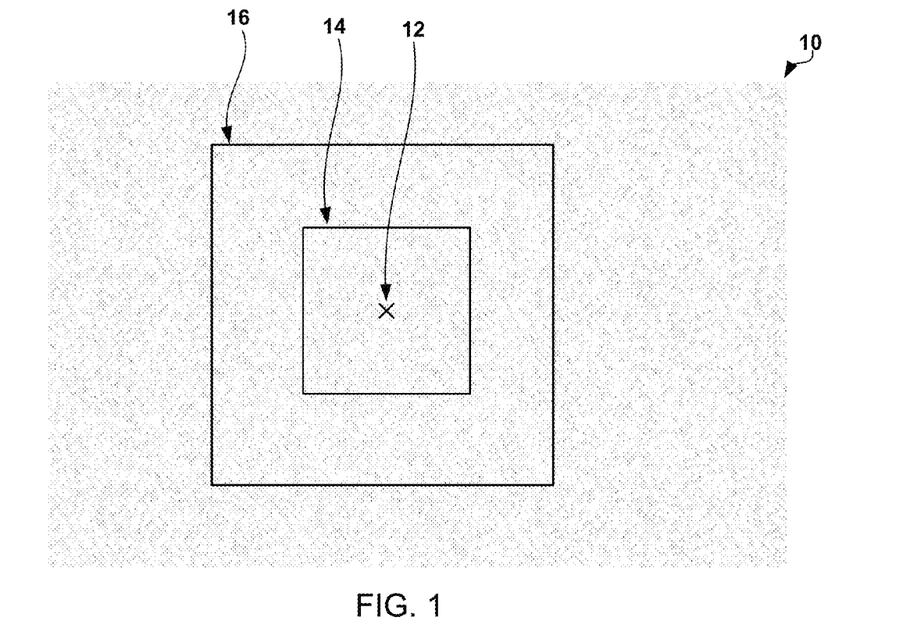
FIG. 1 is a picture illustrating two local analysis windows of two different sizes.

Some embodiments of the present invention comprise adaptive window size selection prior to motion vector determination. A window size may be determined for a substantially symmetric local analysis window substantially centered on a pixel of interest at location (i,j) where a motion vector is to be estimated. Exemplary substantially symmetric windows may be square, rectangular, circular, elliptical or other substantially symmetric shapes. A minimum window size, denoted $r_{min}$, may be set to guarantee a minimum level of performance. In an exemplary embodiment, the minimum window size may be a 5×5 pixel square window. In another exemplary embodiment, the minimum window size may be related to the size of the image. For example, the minimum window size may be a fixed percentage of the image size. A maximum window size, denoted $r_{max}$, may be set to limit the processing time or resource consumption. In an exemplary embodiment, the maximum window size may be a 15×15 pixel square window. In another exemplary embodiment, the maximum window size may be related to the size of the image. For example, the maximum window size may be a fixed percentage of the image size. Intermediate window sizes may also be pre-determined. In an exemplary embodiment, the candidate window sizes may be a 7×7 pixel square window, an 11×11 pixel square window and a 15×15 pixel square window. Hence, an optimal window size may be selected from a set of pre-determined candidate window sizes. FIG. 1 illustrates an exemplary image area 10, a center pixel 12, also referred to as a window center, and two candidate windows 14, 16 of sizes $r_1$ and $r_2$, respectively, overlaid on the image area 10. The two analysis windows 14, 16 may be denoted $\Omega_{i,j;r1}$ and $\Omega_{i,j;r2}$, respectively.

In some embodiments of the present invention, the amount and strength of structural variations in the image pixel data may be used to select the window size. The greater the amount and strength of structural variations inside the local analysis window, the easier it may be for a motion estimator to find a correct local motion and the smaller the uncertainty in the estimated local motion vector. The underlying assumption may be that the structural variations may be due to an underlying structure, for example, an object moving with a single motion. Conversely, the greater the strength of non-structural variations, for example, noise, the harder it may be for a motion estimator to find the correct local motion and the higher the uncertainty in the estimated motion vector. The noise, which may include camera noise and compression noise, may be substantially constant throughout a video frame, or it may vary slowly throughout the video frame and video sequence. The noise strength may be estimated using a noise estimation technique known in the art. The amount of local structural variations may vary strongly throughout a video frame and may be estimated at each location of interest.

In some embodiments of the present invention, the local structural variations may be estimated based on the local image-gradient values near the pixel of interest. This gradient data may be already available in the motion estimation algorithm. Specifically, the squared derivative values $f_x(m,n)f_x(m,n)$ and $f_y(m,n)f_y(m,n)$ are summed over the pixels in a window. Thus, by storing partial sums of these terms over increasingly larger windows, negligible additional computational cost may be incurred. For example, for the windows depicted in FIG. 1, a system may compute the partial sums, denoted $S_x(\cdot)$ and $S_y(\cdot)$, over a small window first according to:

$$S_x(r_1) = \sum_{m,n \in \Omega_{i,j;r1}} f_x(m,n)f_x(m,n)$$

and $$S_y(r_1) = \sum_{m,n \in \Omega_{i,j;r1}} f_y(m,n)f_y(m,n),$$

and then continue accumulating derivative terms over additional pixels to compute the sums associated with a larger window:

$$S_x(r_2) = \sum_{m,n \in \Omega_{i,j;r2}} f_x(m,n)f_x(m,n)$$

and $$S_y(r_2) = \sum_{m,n \in \Omega_{i,j;r2}} f_y(m,n)f_y(m,n).$$

In some embodiments, the horizontal and vertical components may be added to compute a partial sum of the gradient-magnitude squared, for example, for the two window case:

$$S(r_1)=S_x(r_1)+S_y(r_1)$$

and $$S(r_2)=S_x(r_2)+S_y(r_2).$$

In general, $S(r_k)=S_x(r_k)+S_y(r_k)$ for the $k^{th}$ candidate window size.

According to some embodiments of the present invention the values of these partial sums may be used to select an appropriate window size. In some embodiments of the present invention, the size of the smallest window for which the sum $S(r_k)$ exceeds a threshold may be selected as the window size to use at the location of interest. In some embodiments, the threshold value may be based on an estimate of the noise strength. Thus, the window size may be selected according to:

$$r_{selected}=\min\{r \in C | S(r) > T_{win}\},$$

where C denotes the set of candidate window sizes. In an exemplary embodiment, $T_{win}=25$.

Figure 2:
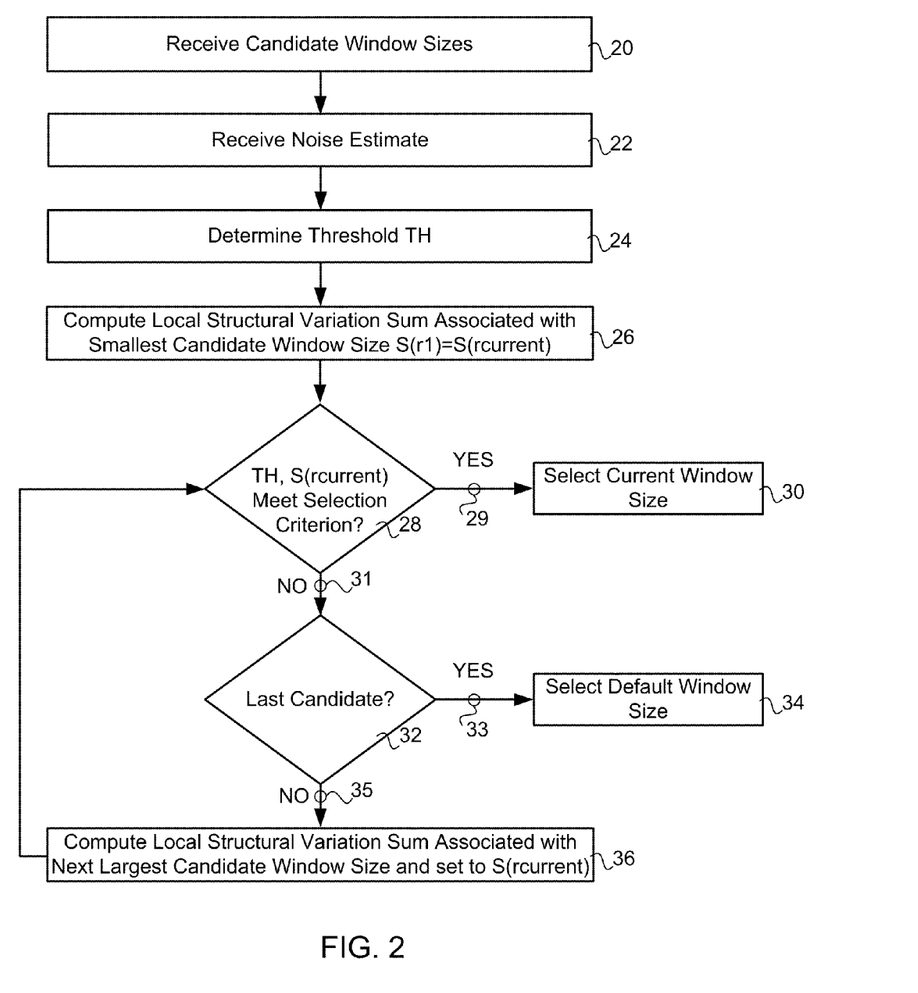
FIG. 2 is a chart showing exemplary embodiments of the present invention comprising selection of local-analysis-window size based on local structural variation.

Some embodiments of the present invention may be described in relation to FIG. 2. In these embodiments, candidate window sizes may be received 20 in a computing system associated with a motion estimation system. A noise estimate may also be received 22 in the computing system. A threshold may be determined 24 based on the noise estimate, and a partial sum of local structural variations may be computed 26 for the smallest candidate window size. In some embodiments, the partial sum may comprise the squared gradient values according to:

$$S(r_1) = \sum_{m,n \in \Omega_{i,j;r1}} f_x(m,n)f_x(m,n) + \sum_{m,n \in \Omega_{i,j;r1}} f_y(m,n)f_y(m,n),$$

where $r_1$ denotes the smallest candidate window size. The current partial sum, $S(r_1)$, and the threshold value may be examined 28 to determine if they meet a selection criterion. An exemplary selection criterion may comprise comparing the current partial sum to the threshold to determine if the current partial sum is greater than the threshold. If the selection criterion is met 29, then the current window size may be selected 30 as the window size. If the selection criterion is not met 31, then the current candidate window size may be examined 32 to determine if it is the last candidate. If the current candidate window size is 33 the last candidate, then a default window size may be selected 34. In some embodiments, the default window size may be a predetermined window size. In alternative embodiments, the default window size may be the largest candidate window size. If the current candidate window size is not 35 the last candidate window size, then the current partial sum may be updated 36 to include the pixels in the next-largest window size that are not currently accounted for in the current sum. The updated sum, now the current sum, and threshold value may be examined 28.

Figure 3:
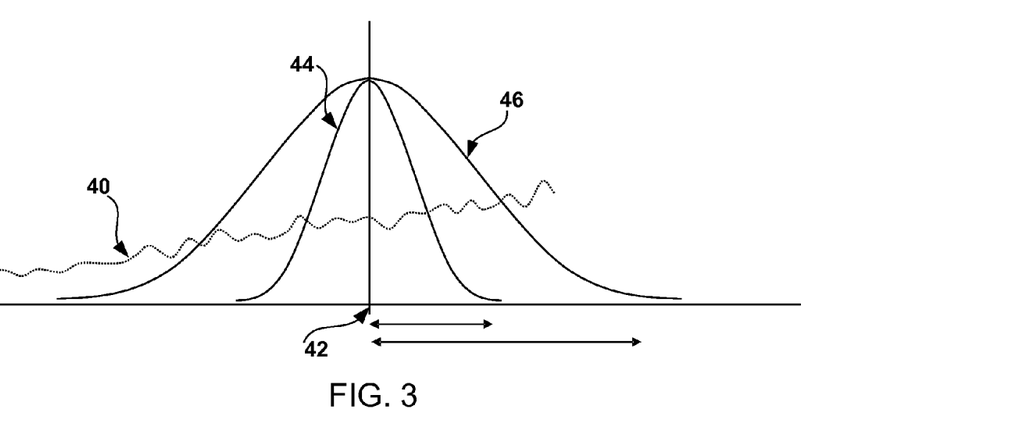
FIG. 3 is a picture illustrating two adaptive window functions.

Some embodiments of the present invention may comprise adaptive window size selection in motion estimation comprising a spatial window function, for example, a Gaussian window function. In some embodiments, a window parameter controlling the scaling of the window function may be selected, for example, for a Gaussian window function, the $\sigma$ parameter may be selected. FIG. 3 illustrates, in one dimension, exemplary image pixel values 40, a window center 42 and two window functions 44, 46 corresponding to a narrow Gaussian window 44 and a wider Gaussian window 46. In alternative embodiments, the size of the window function may be related to a radius, whereat the window function falls to a predetermined value, for example, 0.5, substantially zero or an other predetermined value.

A parameter associated with a spatial window function may be denoted by r, and the parameter may be selected according to:

$$r_{selected} = \min\{r \in C | S(r) > T_{win}\},$$

where C denotes the candidate values and the partial sum associated with a parameter r may be given by:

$$S(r) = \sum_{m,n \in \Omega_{i,j;r}} w(m,n) f_x(m,n) f_x(m,n) + \sum_{m,n \in \Omega_{i,j;r}} w(m,n) f_y(m,n) f_y(m,n).$$

In some of these embodiments, partial sums for a wider window function may not be able to be computed based on previously computed partial sums. However, in the case of a rectangular window function, the partial sum associated with a wider window function may be computed based on a previously computed partial sum.

Some embodiments of the present invention comprise methods and systems for determining data-adaptive weight functions for gradient-based motion estimation. According to some embodiments of the present invention, the weights, w(m,n), for samples inside an analysis window, $\Omega_{i,j}$, may be determined as a function of the image pixel data around the pixel of interest (i,j).

Figure 4A:
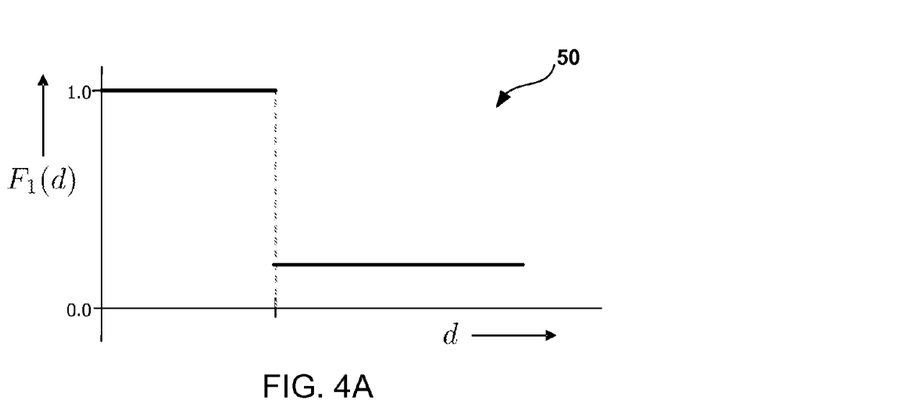
FIG. 4A is a picture illustrating an exemplary weighting function based on pixel values.
Figure 4B:
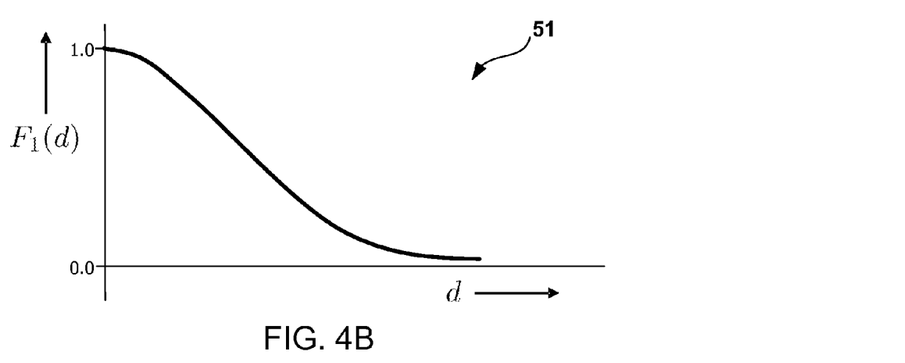
FIG. 4B is a picture illustrating an exemplary weighting function based on pixel values.

In some embodiments, a weight at a pixel (m,n) may be based on the difference of the image pixel value f(m,n) and the value of the image pixel at the window center f(i,j) according to:

$$w_1(m,n) = F_1(|f(i,j) - f(m,n)|)$$

where the functional relation $F_1(\bullet)$ may decrease for increasingly larger absolute differences between f(i,j) and f(m,n). The resulting weight value may be close to 1.0 when the absolute difference is small and may decrease to a lower non-negative value with increasingly larger absolute differences. FIGS. 4A and 4B illustrate two exemplary such functions 50, 51.

In the exemplary function shown in FIG. 4A 50, the weighting is based on a two-valued function $F_1(\bullet)$ according to:

$$w_1(m,n) = \begin{cases} 1.0 & \text{if } |f(i,j) - f(m,n)| < T_1 \\ c_1 & \text{otherwise} \end{cases},$$

where $T_1$ is a pre-determined threshold value and $0.0 \le c_1 \le 1.0$ is a pre-determined weight value. In an exemplary embodiment, $T_1 = 20$ and $c_1 = 0.0$. In an alternative exemplary embodiment, $c_1 = 0.1$.

In the exemplary function shown in FIG. 4B 51, the weight is based on an exponential function $F_1(\bullet)$ according to:

$$w_1(m,n) = \exp\left(\frac{(f(i,j) - f(m,n))^2}{2\sigma_1^2}\right),$$

where $\sigma_1$ is a pre-determined weighting parameter. In an exemplary embodiment, $\sigma_1 = 5$ In alternative embodiments, a weight at a pixel (m,n) may be based on the values of the strength of the gradient at locations inside the analysis window. In some embodiments, a weight at pixel (m,n) may be based on the value of the gradient strength at pixel (m,n) and an average value of the gradient strength for pixels in a small sub-window around the window center (i,j). Denoting an estimate of the gradient strength at a pixel location (m,n) as G(m,n), the average value of the gradient strength for pixels in a small sub-window around the window center may be determined according to:

$$CG(i,j) = \frac{1}{|\Omega_s|} \sum_{m,n \in \Omega_s} G(m,n),$$

where $\Omega_s$ is a small sub-window centered at the window center and $|\Omega_s|$ denotes the number of pixels in the sub-window. Exemplary sub-window sizes are 1×1, 3×3 and 5×5. In alternative embodiments, the sub-window is substantially symmetric, but not necessarily square. In some embodiments of the present invention, the gradient strength at a pixel location may be estimated by the gradient magnitude squared at the pixel:

$$G(m,n) = \|\nabla f(m,n)\|^2 = f_x(m,n) f_x(m,n) + f_y(m,n) f_y(m,n).$$

In these embodiments, the additional computation expense may be negligible since the derivative terms used to compute G(m,n) are available in the gradient-based motion estimation algorithm. In alternative embodiments, other approximations known in the art for the gradient strength may be used, for example, the absolute value of the derivatives.

In some embodiments of the present invention, the data-adaptive weight at a pixel location (m,n) may be based on the similarity between the value of the gradient strength, G(m,n), at (m,n), and the sub-window average, CG(i,j), according to:

$$w_2(m,n) = F_2(CG(i,j), G(m,n)),$$

where the functional relation $F_2(\bullet)$ may increase for increasing similarity between G(m,n) and CG(i,j). The resulting weight value may be close to 1.0 when the values of G(m,n) and CG(i,j) are similar and may decrease to a lower non-negative value with increasingly larger differences. In an exemplary embodiment, a weight $w_2(m,n)$ may be based on a two-valued function $F_2(\bullet)$ according to:

$$w_2(m,n) = \begin{cases} 1.0 & \text{if } G(m,n) < K_2 CG(i,j) \\ c_2 & \text{otherwise} \end{cases},$$

where $K_2$ is a pre-determined parameter value and $0.0 \leq c_2 \leq 1.0$ is a pre-determined weight value. In an exemplary embodiment, $K_2=8.0$ and $C_2=0.0$. In an alternative exemplary embodiment, $c_2=0.1$.

In some embodiments of the present invention, a weight may be a combination of a weight based on the difference of the image pixel value $f(i,j)$ and $f(m,n)$ and a weight based on the strength of the gradient at locations inside the analysis window. In an exemplary embodiment, the combination may be formed according to:

$$w(m,n)=w_1(m,n) \cdot w_2(m,n).$$

In alternative embodiments, the combination may be formed according to:

$$w(m,n)=\min\{w_1(m,n),w_2(m,n)\}.$$

Embodiments of the present invention have been described herein in relation to a basic Lucas and Kanade motion estimation technique. The Lucas and Kanade technique has been extended in many ways, for example, the basic technique has been included in coarse-to-fine motion estimation algorithms, also known as multi-scale, multi-resolution or pyramid-based algorithms. The Lucas and Kanade technique has been combined with methods to promote spatial smoothness and consistency of the motion field. The embodiments of the present invention described herein may be incorporated in extended and combined Lucas and Kanade techniques.

Exemplary constants and threshold values which have been indicated in the foregoing specification are intended for illustration and not of limitation.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for determining data-adaptive weights in a motion
   estimation system, said method comprising:
   selecting, in a computing system associated with a motion estimation system, a size of a local analysis window based on a local structural variation in a current image and a noise estimate associated with said current image;
   receiving a plurality of image pixel values associated with said local analysis window in said current image;
   identifying a window-center image pixel value associated with a window center location in said local analysis window;
   calculating a weight associated with a first location in said local analysis window based on a difference between said window-center image pixel value and an image pixel value associated with said first location; and
   performing gradient-based motion estimation using said weight to estimate a motion vector at said window center location.

2. The method as described in claim 1, wherein said weight associated with said first location is a first value when said difference and a threshold meet a first criterion and a second value when said difference and said threshold do not meet said first criterion.

3. The method as described in claim 1, wherein said weight associated with said first location is based on an exponential function dependent on said difference.

* * * * *

UNITED STATES PATENT AND TRADEMARK OFFICE
CERTIFICATE OF CORRECTION

| | | |
|---|---|---|
| PATENT NO. | : 9,307,251 B2 | Page 1 of 1 |
| APPLICATION NO. | : 12/543597 | |
| DATED | : April 5, 2016 | |
| INVENTOR(S) | : Petrus Van Beek et al. | |

It is certified that error appears in the above-identified patent and that said Letters Patent is hereby corrected as shown below:

IN THE SPECIFICATION

In column 8, at line 18, a formula has been incorrectly printed. The formula should be printed as follows:

$$S(r_2) = S_x(r_2) + S_y(r_2)$$

Signed and Sealed this
Thirty-first Day of May, 2016

Michelle K. Lee
*Director of the United States Patent and Trademark Office*